(12) United States Patent
Moceri et al.

(10) Patent No.: US 7,875,379 B2
(45) Date of Patent: Jan. 25, 2011

(54) ELECTROCHEMICAL CELL HAVING A POCKET SEPARATOR DESIGN

(75) Inventors: Kenneth Moceri, North Tonawanda, NY (US); Tina Urso, East Amherst, NY (US); Paul Hallifax, Gasport, NY (US); Raymond Konopa, Alden, NY (US); Scott Hall, North Tonawanda, NY (US); Deborah McNally, Lancaster, NY (US); Daniel Baumer, Middleport, NY (US); Dominick Frustaci, Williamsville, NY (US); Philip Wutz, Williamsville, NY (US); Shenandoah Hennrich, Williamsville, NY (US); John Skoumpris, Amherst, NY (US); Michael Guidi, West Seneca, NY (US); Brian Mau, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 1194 days.

(21) Appl. No.: 11/177,017

(22) Filed: Jul. 8, 2005

(65) Prior Publication Data

US 2007/0009789 A1    Jan. 11, 2007

(51) Int. Cl.
*H01M 2/18*    (2006.01)
(52) U.S. Cl. .................. 429/139; 429/129; 429/131; 429/136; 429/144
(58) Field of Classification Search .................. None
See application file for complete search history.

(56) References Cited

U.S. PATENT DOCUMENTS

| 4,310,609 | A |   | 1/1982  | Liang et al. |
|-----------|---|---|---------|--------------|
| 4,391,729 | A |   | 7/1983  | Liang et al. |
| 4,440,838 | A |   | 4/1984  | Schmidt |
| 4,668,320 | A | * | 5/1987  | Crabtree ..................... 156/192 |
| 4,788,113 | A |   | 11/1988 | Bohle et al. |
| 5,004,656 | A |   | 4/1991  | Sato et al. |
| 5,098,801 | A |   | 3/1992  | Boram et al. |
| 5,472,810 | A |   | 12/1995 | Takeuchi et al. |
| 5,486,215 | A | * | 1/1996  | Kelm et al. ................ 29/623.1 |
| 5,516,340 | A |   | 5/1996  | Takeuchi et al. |
| 5,744,261 | A |   | 4/1998  | Muffoletto et al. |
| 5,776,632 | A |   | 7/1998  | Honegger |
| 5,882,362 | A |   | 3/1999  | Muffoletto et al. |
| 6,004,692 | A |   | 12/1999 | Muffoletto et al. |
| 6,383,680 | B1 |  | 5/2002  | Hallifax et al. |
| 6,420,066 | B1 |  | 7/2002  | Frustaci et al. |
| 6,423,442 | B1 |  | 7/2002  | Hallifax et al. |
| 6,508,901 | B2 |  | 1/2003  | Miller et al. |

(Continued)

*Primary Examiner*—Ula C Ruddock
*Assistant Examiner*—Tony Chuo
(74) *Attorney, Agent, or Firm*—Michael F. Scalise

(57) ABSTRACT

An electrochemical cell comprising a cathode material contacted to a perforated current collector having a portion left uncovered and an anode material contacted to an anode current collector is described. A separator sheet segregating the anode from direct contact with the cathode is folded back upon itself along a crease with an upper portion at least partially sealed to a lower portion along an aligned peripheral edge to form an envelope. A first envelope portion houses the cathode having the uncovered portion of the cathode current collector spaced from the crease and a second envelope portion houses the anode. The first envelope portion is sealed to the second envelope portion through the uncovered perforations of the cathode current collector to lock the anode aligned with the cathode. The anode and cathode are then wound into a jellyroll electrode assembly housed in a cylindrical casing and activated with an electrolyte.

23 Claims, 14 Drawing Sheets

U.S. PATENT DOCUMENTS

| | | |
|---|---|---|
| 6,544,682 B1 | 4/2003 | Takami et al. |
| 6,670,071 B2 | 12/2003 | Skinlo et al. |
| 6,677,076 B2 | 1/2004 | Nakahara et al. |
| 2003/0054232 A1 | 3/2003 | Zucker |
| 2003/0054233 A1 | 3/2003 | Zucker |
| 2003/0054234 A1 | 3/2003 | Zucker |
| 2003/0054235 A1 | 3/2003 | Zucker |
| 2003/0059673 A1 | 3/2003 | Langan et al. |
| 2003/0134184 A1* | 7/2003 | Skinlo et al. .......... 429/94 |
| 2004/0131924 A1 | 7/2004 | Anglin et al. |

* cited by examiner

_US 7,875,379 B2_

ELECTROCHEMICAL CELL HAVING A POCKET SEPARATOR DESIGN

BACKGROUND OF THE INVENTION

The present invention generally relates to the conversion of chemical energy to electrical energy. More particularly, the invention describes an electrochemical cell having an anode or negative electrode and a cathode or positive electrode provided in a spirally wound or jellyroll-type configuration. This electrode assembly is then housed in a cylindrically shaped casing. A preferred chemistry of the cell is of a lithium anode and a silver vanadium oxide cathode.

SUMMARY OF THE INVENTION

The present invention relates to an electrochemical cell comprising an anode active material, such as lithium or $LiC_6$, contacted or covering an anode current collector and a solid cathode active material, such as silver vanadium oxide, fluorinated carbon, or lithium cobalt oxide, contacted to or covering a perforated cathode current collector. A minor portion of the cathode current collector is left bare or uncovered by cathode material.

A terminal pin is joined to the cathode current collector at the uncovered portion. The terminal pin is preferably of molybdenum, while the cathode current collector is preferably of titanium. Since these materials are difficult to weld together, especially with the terminal pin being of a relatively small diameter, a portion of the terminal pin is received in a couple, preferably of titanium, and the couple is secured to the uncovered portion of the cathode current collector. The portion of the terminal pin without the couple is supported in a lid by an insulating glass.

A flanged-shaped, upper insulator electrically insulates the couple and pin from the bottom of an upper lid and the casing sidewall. This prevents potential bridging of lithium clusters between surfaces of opposite polarity. Conventionally, the insulating component for this purpose has been in the form of a thin walled cup with the base of the cup insulating the bottom of the upper lid and the cup walls insulating the side walls of the casing from the pin and couple, as described in U.S. Pat. Nos. 5,744,261, 5,882,362, and 6,004,692, all to Muffoletto, et al. These patents are assigned to the assignee of the present invention and incorporated herein by reference.

A separator segregates the cathode from direct contact with the anode. The separator is a sheet of woven or non-woven ionically permeable material folded back upon itself along a crease. An upper portion of the separator is at least partially heat sealed to a lower portion along aligned peripheral edges thereof. This forms a separator envelope comprising a first envelope portion housing the cathode, with the bare current collector portion spaced from the crease. The folded separator also forms a second envelope portion for housing the anode. The second envelope portion is then folded over the first envelope portion. The first and second envelope portions are heat sealed to each other through the uncovered perforations of the cathode current collector.

An anode is inserted into an open end of the second enclosure portion of the separator with a final heat seal confining it therein. The anode and cathode are now in an aligned and overlaying relationship with each other and the assembly is wound to form a jellyroll-type electrode assembly. An outer wrap of the anode has the anode active material only on an inner side of the anode current collector. Similarly, the inner wrap of the anode may have the anode active material only on an outside of the anode current collector. This helps with volumetric efficiency, as there is no need to have lithium active material unopposed by cathode active material.

A lower insulator inserted onto the couple electrically separates the pin and the lower portion of the electrode assembly from the bottom of a lower lid and the adjacent casing sidewalls. This prevents possible bridging of lithium clusters between surfaces of opposite polarity there. The electrode assembly including the lid and upper insulater supported by the terminal pin/couple is then fitted into a cylindrical casing. The anode current collector has at least-one extending lead or tab captured between the lid and the cylindrical casing. Welding the upper lid to case connects the anode to the casing as its terminal while hermetically sealing the cell. The upper lid insulator also shields the separator of the electrode assembly from the heat of the upper lid to case weld.

The electrode assembly is activated with an electrolyte, preferably of a non-aqueous chemistry. Finally, a fill plug is inserted into and welded to the lower lid. The lower lid insulator also serves to shield the separator of the electrode assembly from the heat of the final close weld.

These and other aspects of the present invention will become more apparent to those skilled in the art by reference to the following description and to the appended drawings.

DETAILED DESCRIPTION OF THE PREFERRED EMBODIMENTS

Figure 1:
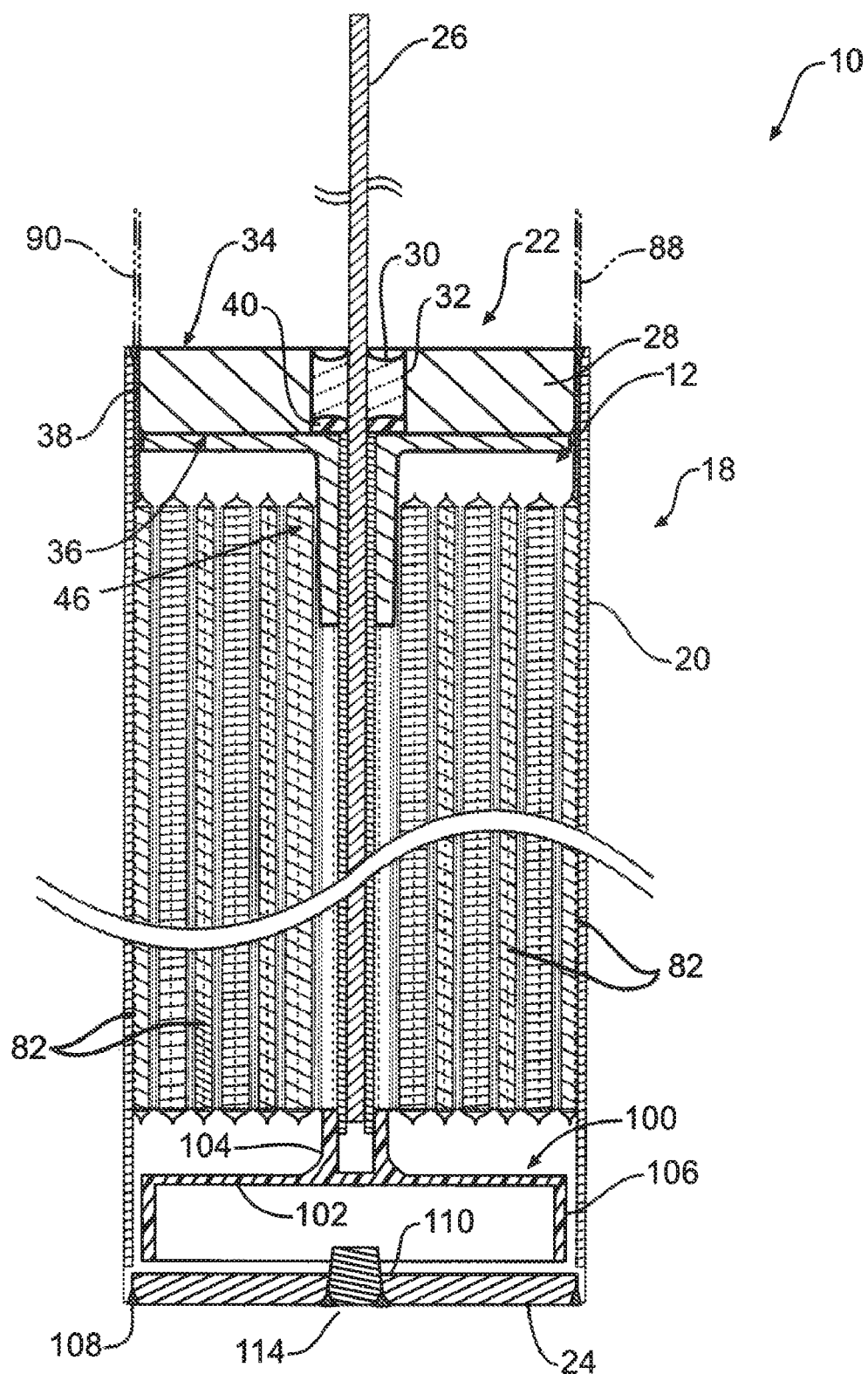
FIG. 1 is a cross-sectional view of an electrochemical cell 10 of the present invention.

Referring now to the drawings, FIG. 1 is a cross-sectional view of an electrochemical cell 10 according to the present invention. The cell comprises an electrode assembly 12 including a cathode 14 (FIG. 2) and an anode 16 (FIG. 6) provided in a jellyroll configuration. The jellyroll electrode assembly 12 is housed inside a cylindrically shaped casing 18 made of metal, such as stainless steel, titanium, nickel, aluminum, or other suitable electrically conductive material. The casing comprises a cylindrical tube 20 that is closed at its upper end by a header assembly 22 and at its lower end by a lower lid 24.

Figure 2:
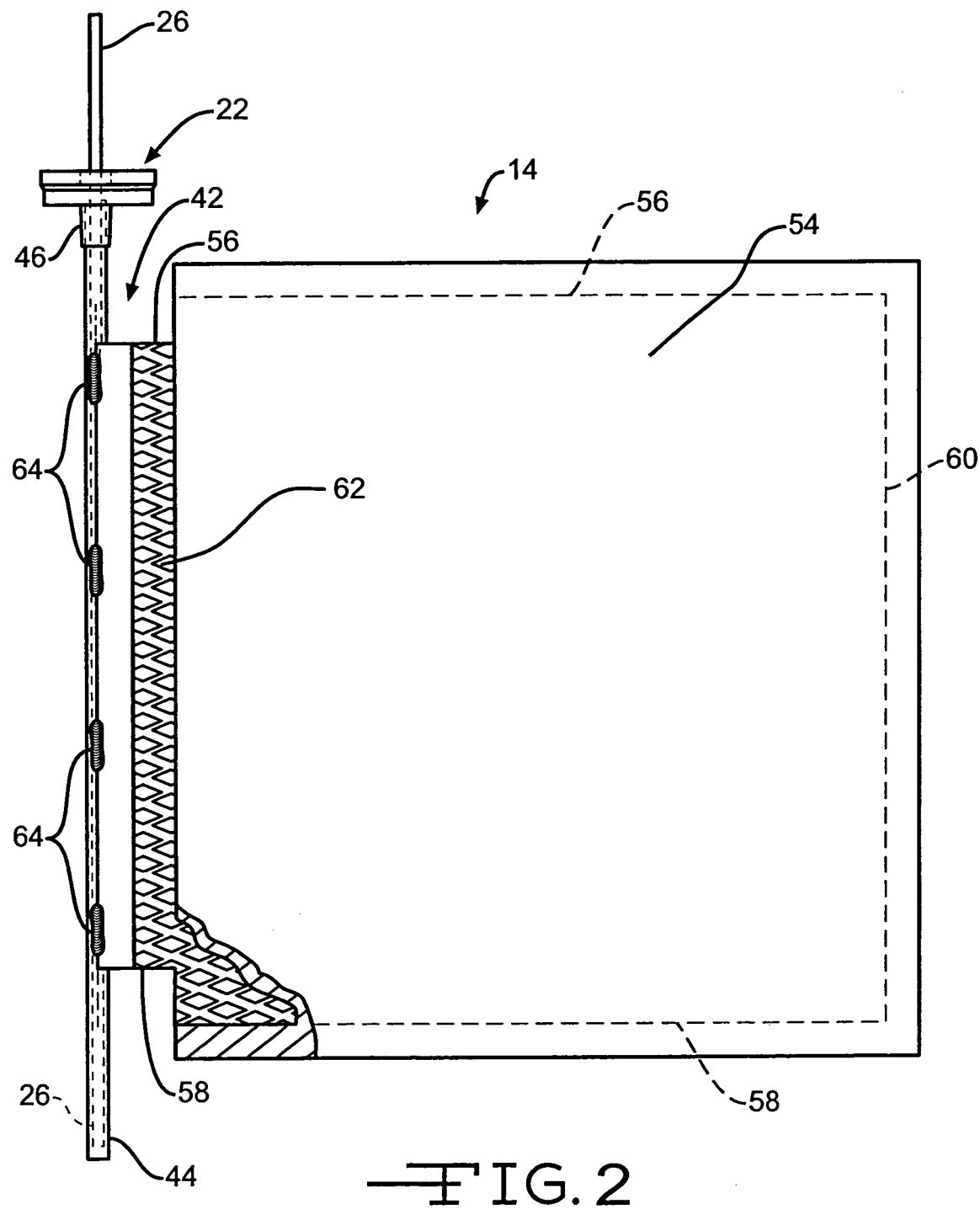
FIG. 2 is a side elevational view of a cathode 14 having a current collector 42 welded to a couple 44 for and a cathode terminal pin 26 supported in header assembly 22.
Figure 3:
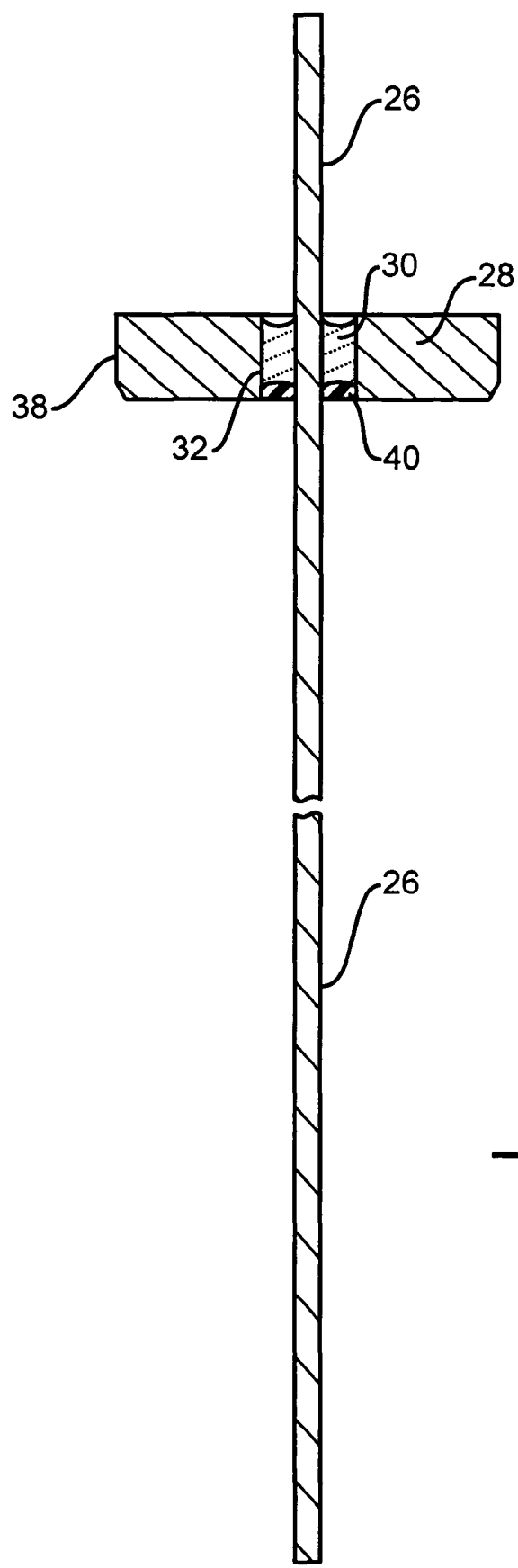
FIG. 3 is a cross-sectional view of the header assembly 22 including the terminal pin 26 glassed into the upper lid, 28.
Figure 6:
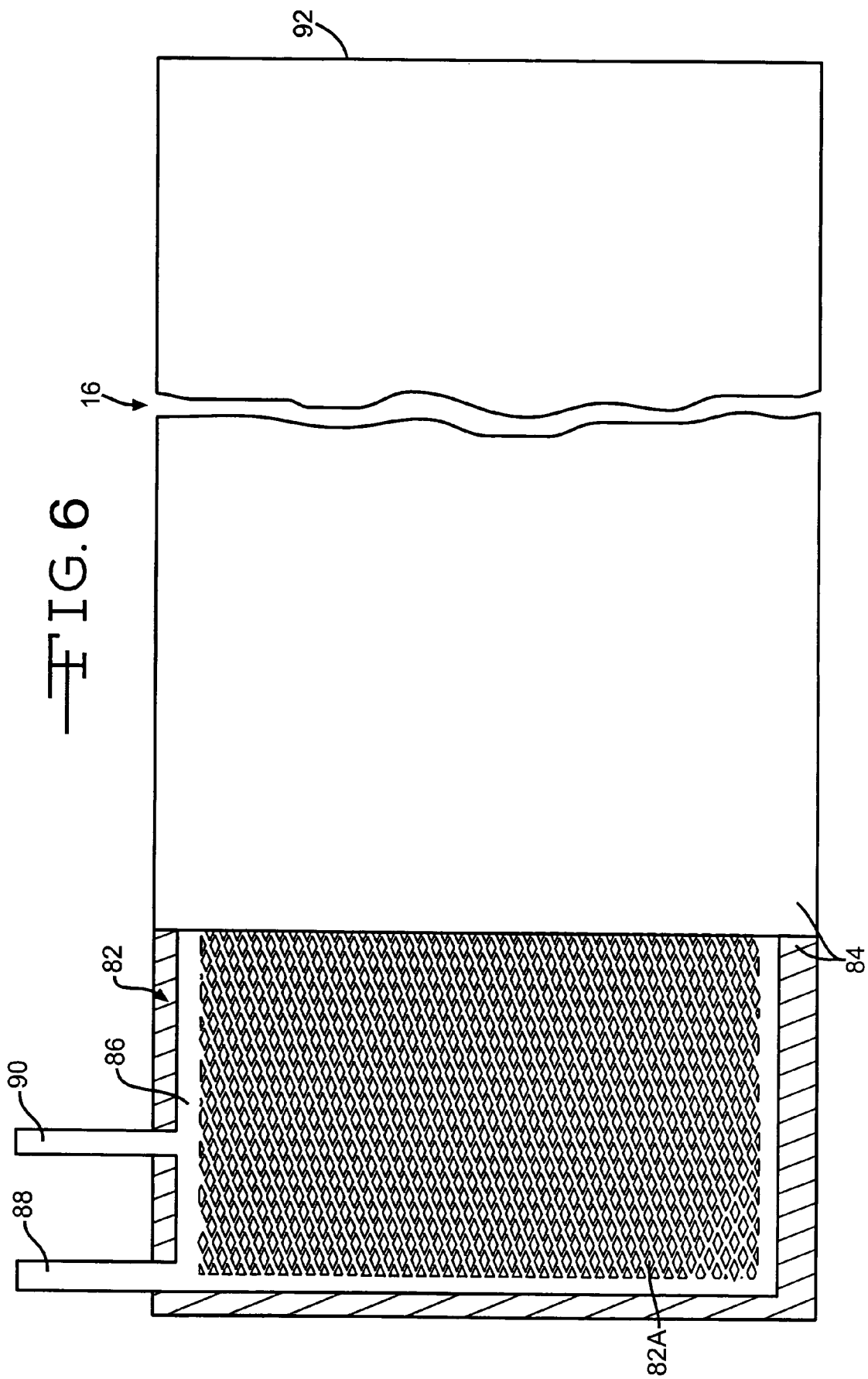
FIG. 6 is a side elevational view of an anode 16.

Preferably, the cell 10 is built in a case negative design with the casing 18 serving as the anode terminal. However, the cell can also be built in a case-positive design. In that design, the electrode shown in FIG. 2 is the anode and the electrode in FIG. 6 is the cathode. Both the case-negative and case-positive electrode designs are well known by those skilled in the art.

In the preferred case-negative electrode design, the cathode 14 is connected to a terminal pin 26. The header assembly 22 fitted into the upper open end of the tube 20 comprises an upper lid 28 supporting a glass material 30 sealing between a lid opening 32 and the terminal pin 26. The sealing glass 30 is of a corrosion resistant type having up to about 50% by weight silicon such as CABAL 12, TA 23 or FUSITE 425 or FUSITE 435. This structure is commonly referred to as a glass-to-metal seal (GMTS).

The upper lid 28 (FIG. 4) is a disc-shaped member of the same material as the casing and comprises an upper surface 34 and a lower surface 36 extending to a cylindrical sidewall 38. The sidewall 38 is beveled where it meets the lower lid surface 36. This helps with moving the lid 28 into the casing tube 20 having the lid sidewall 38 in a snug fitting relationship with the upper open end thereof. In this position, the upper lid surface 34 is coplanar with the upper end of the casing tube 20. A polymeric material 40 is filled into the lower meniscus of the sealing glass 30, generally coplanar with the lower surface 36 of the lid 28. The polymeric material 40 helps prevent electrolyte pooling in this meniscus area, which could be a potential space for lithium cluster bridging to the wall forming the lid opening 32. It also prevents attack of the sealing glass 30 by the cell electrolyte.

The terminal pin 26 is of molybdenum, aluminum, nickel alloy, or stainless steel, the former being preferred. The current collector 42 (FIG. 2) for the cathode 14 is of titanium, tantalum, platinum, gold, aluminum, cobalt nickel alloys, highly alloyed ferritic stainless steel containing molybdenum and chromium, and nickel-, chromium- and molybdenum-containing alloys, the former being preferred. A terminal couple 44 is of the same material as the cathode current collector, titanium being preferred. The terminal couple 44, in the shape of an elongate tube, is fitted onto the terminal pin 26 below the header assembly 22. Couple 44 helps bolster the connection between the terminal pin 26 and the cathode current collector 42 for the reason that titanium is difficult to weld to molybdenum, especially in such a fine wire diameter as that of the terminal pin.

Figure 4:
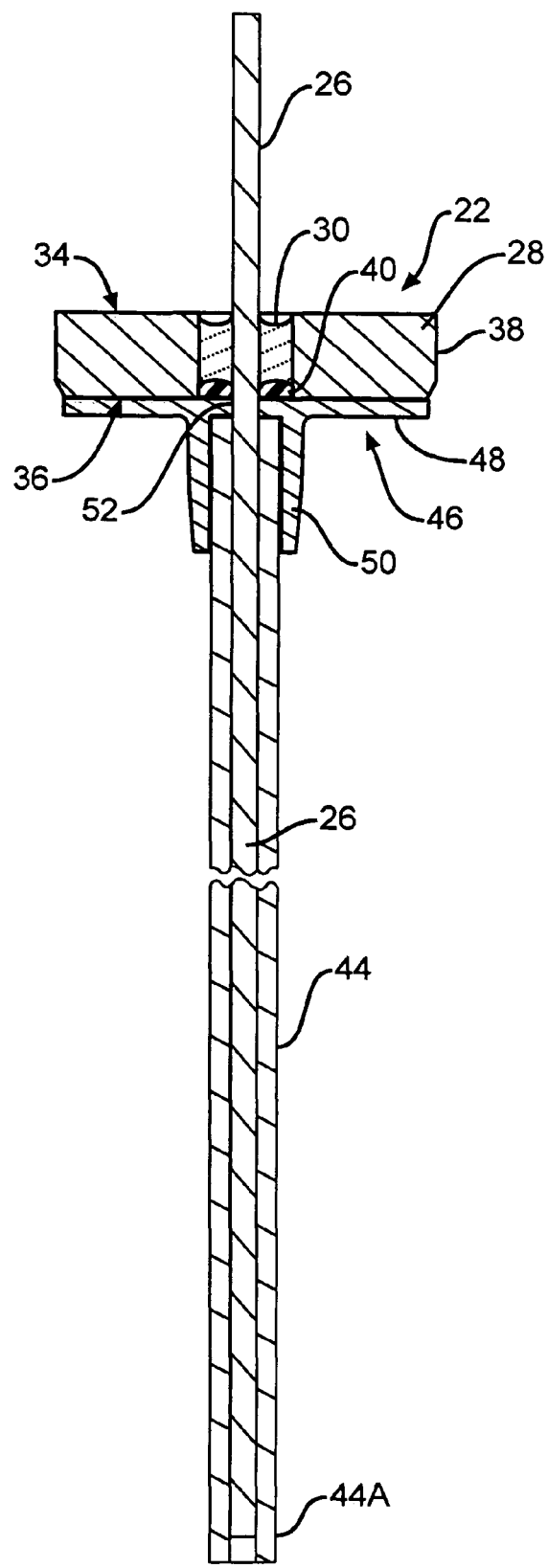
FIG. 4 is a side elevational view in cross section of the header assembly 22 shown in FIG. 3 with an upper insulator 50 proximate the terminal pin 26 and couple 44.

As shown in FIG. 4, a polymeric insulator 46 fits onto the upper end of the terminal couple 44 below the header assembly 22. The insulator 46 comprises a circular disc portion 48 integral with a depending cylindrical portion 50. An opening 52 provided in the disc portion slides over the terminal pin 26 while insulator cylindrical portion 50 is in a closely spaced relationship with the upper end of the terminal couple 44. The upper insulator 46 seats against the lower surface 36 of the lid 28. In this position, the outer surrounding edge of the disc portion 48 meets the lower edge of the lid bevel. The terminal couple 44 is then slid over the terminal pin 26 in a tight fitting, contact relationship with a lower end of the pin recessed into the couple.

In the orientation illustrated in FIG. 2, the cathode 14 is shown comprising the current collector 42 having a cathode active material 54 contacted to both its major sides. The cathode active material 54 extends above and below the upper and lower edges 56 and 58 of the current collector 42 as well as past a right edge 60 thereof. However, a minor portion 62 of the cathode current collector 42 is uncovered by active material at both major sides of the left edge. The current collector 42 can be perforated or of a substantially imperforated foil. Preferably the foil is solid or imperforate where it contacts the terminal couple 44 and perforated for a minor portion of the uncovered portion 62 and where the cathode active material is contacted thereto. Resistance or another type of welding provides welds 64 securing the solid portion of the uncovered current collector portion 62 to the terminal couple 44 at the perforations. The solid portion provides for good weldments 64 to the terminal couple 44.

Figure 5:
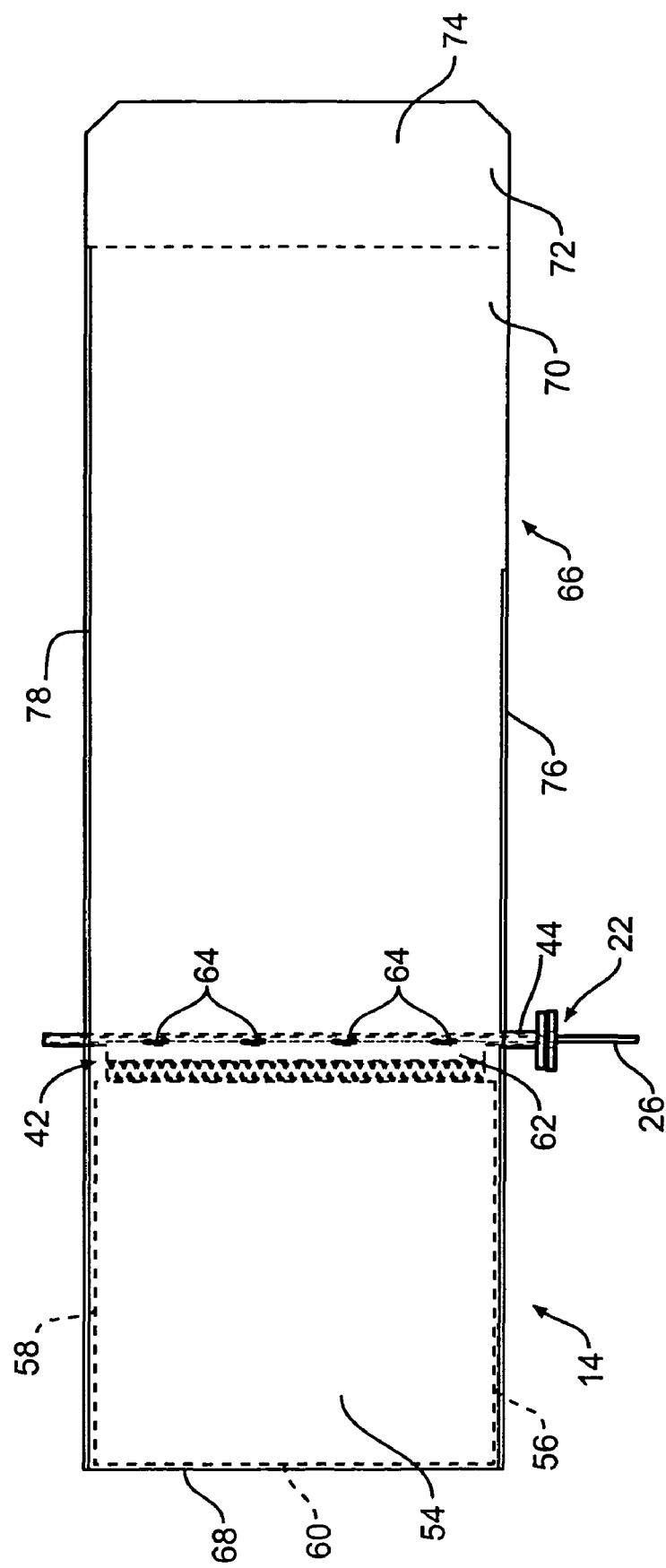
FIG. 5 is an isometric view of the cathode 14 enveloped in a separator 66, showing the direction of the fold

In the orientation illustrated in FIG. 5, which is upside down and rotated 180° with respect to FIG. 2, the cathode 14 is shown secured to the couple 44 with the terminal pin 26 supported in the lid 28 of the header 22 by the sealing glass 30. This assembly is then positioned on top of a separator 66 comprising a rectangular shaped piece of ionically porous polymeric material. The separator 66 is folded back upon itself along a left crease 68 adjacent to the cathode current collector edge 60 to provide an upper portion 70 aligned with and substantially covering a lower portion 72 except for an extending separator flap 74. The upper and lower separator portions 70, 72 cover both sides of the cathode active material 54 and are heat secured to each other along their respective peripheral seal. The peripheral heat seal is made discontinuous at its lower edge 76 by the couple 44 immediately adjacent to the cylindrical portion 50 of the insulator 46 abutting the lid 28. The peripheral separator seal is also made discontinuous at its upper edge 78 by the couple 44 surrounding the distal end of the terminal pin 26. The lower sealed separator edge 76 ends at a distance spaced from the extending flap 74 while the upper sealed separator edge 78 extends to the flap.

Figure 7:
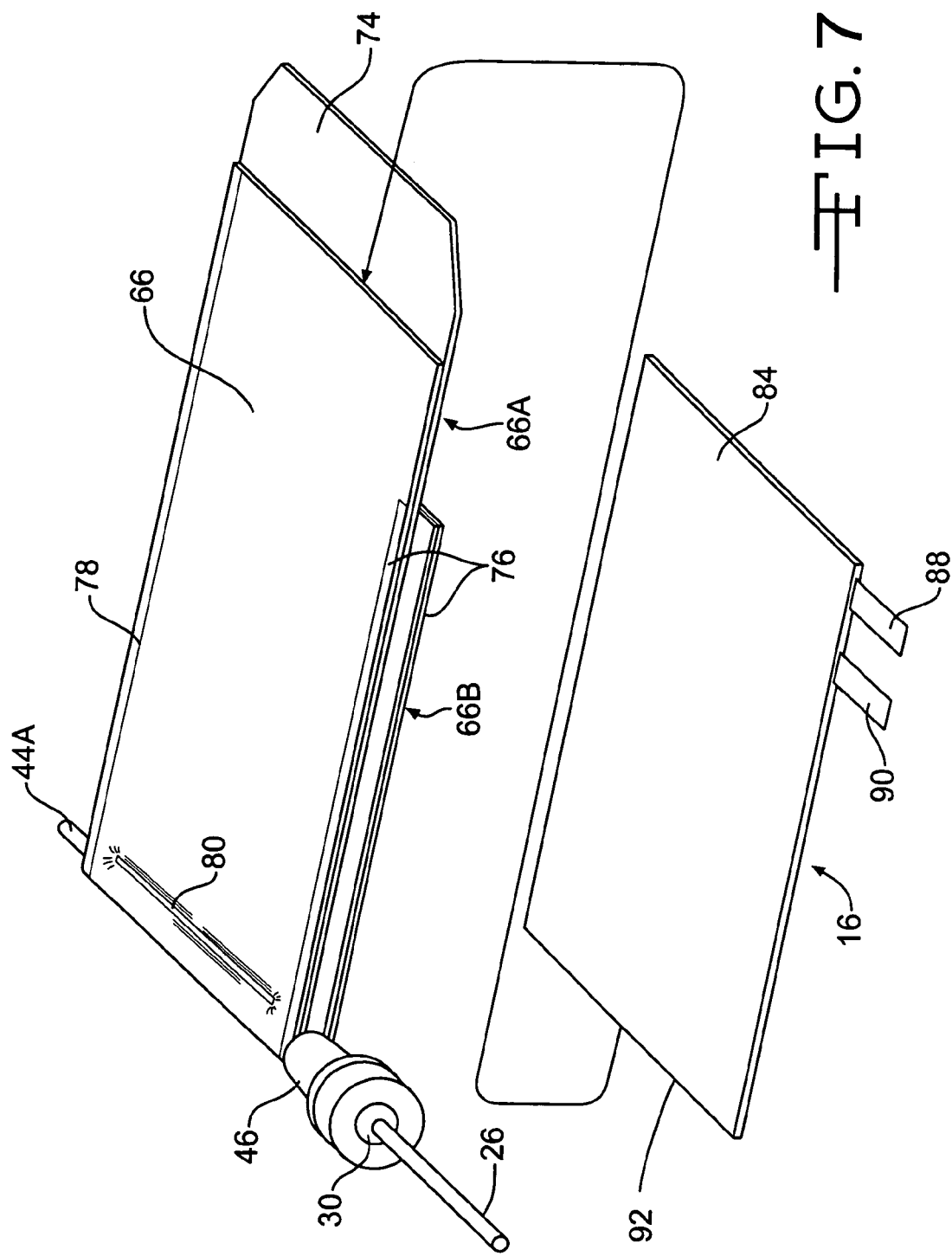
FIG. 7 is a partially exploded isometric view showing the anode 16 being housed in the separator 66 overlaid by the separator enveloped cathode 14.
Figure 8:
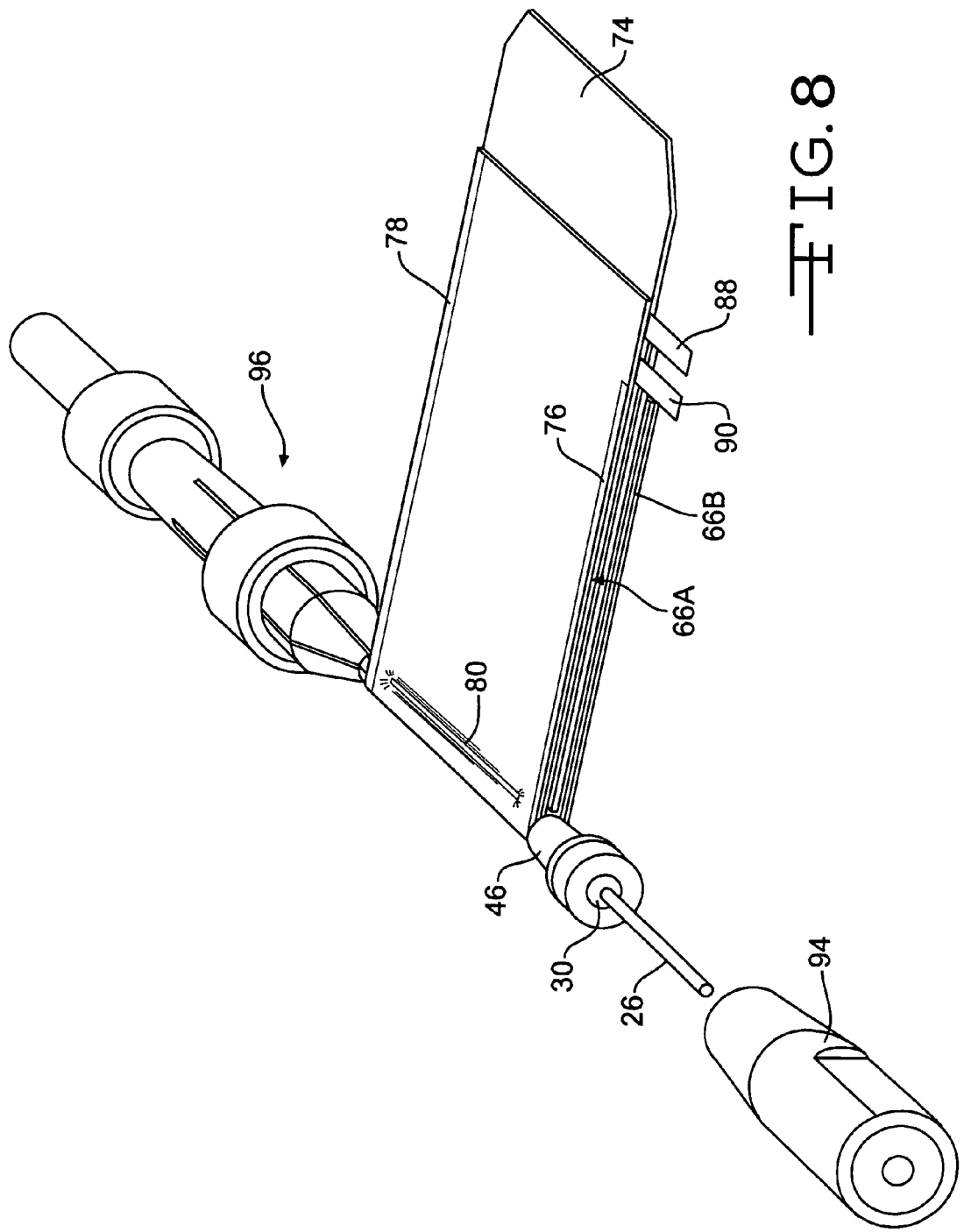
FIG. 8 is a partially exploded isometric view showing the cathode and anode enveloped in the separator before being wound into a jellyroll electrode assembly 12.

The separator 66 is then folded at the terminal pin 26/couple 44. This folding operation forms the upper and lower separator portions 70, 72, into an upper two-ply separator pocket 66A and a lower two-ply separator pocket 66B (FIG. 7). The separator pockets 66A and 66B are then heat secured to each other at a vertical seal 80 by sealing them together through the perforations at the minor uncovered portion 62 of the cathode current collector 42. This locks the cathode 14 in position enveloped inside the lower separator pocket 66B.

Figure 10:
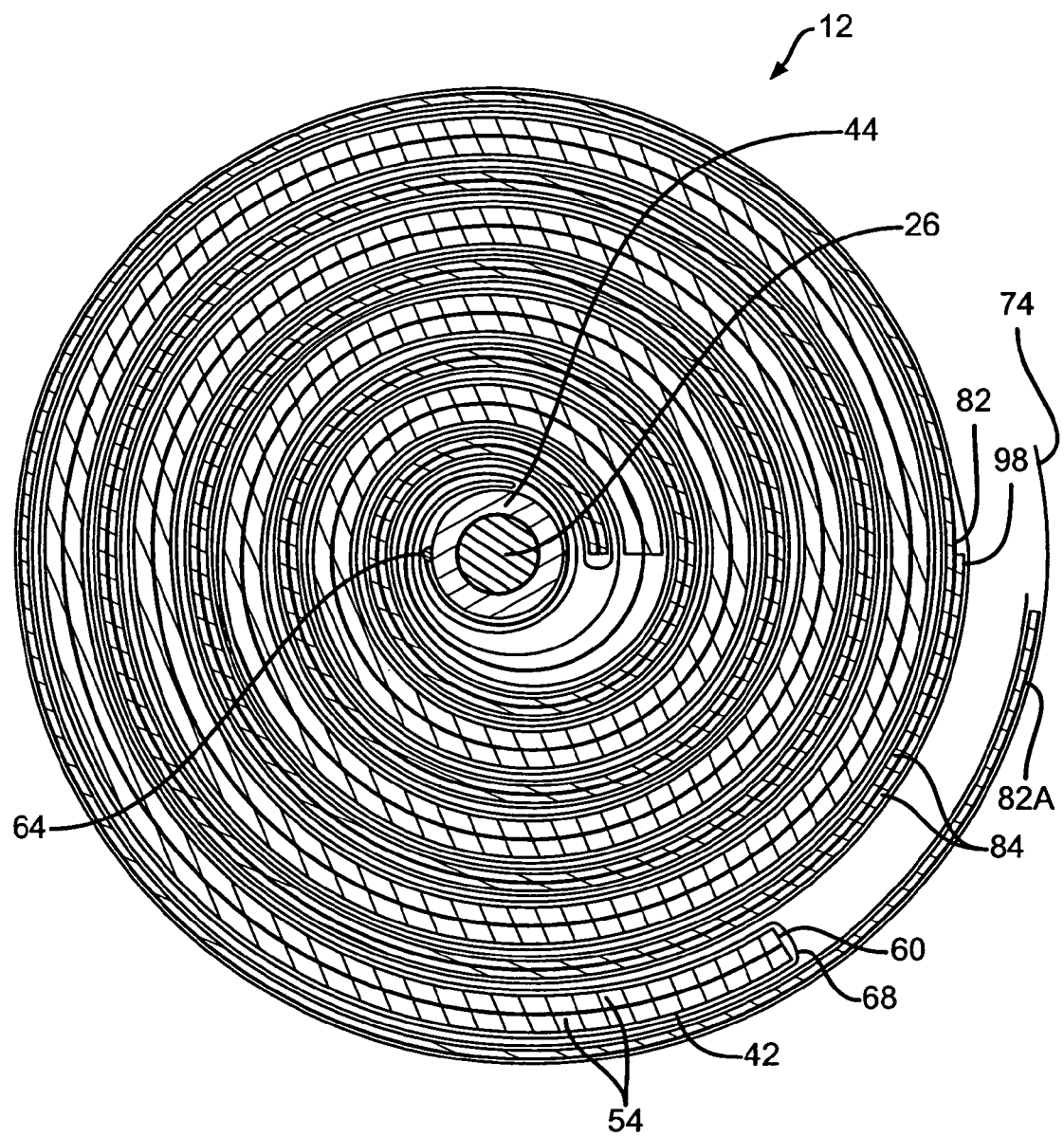
FIG. 10 is a cross-sectional view of the jellyroll electrode assembly 12.
Figure 11:
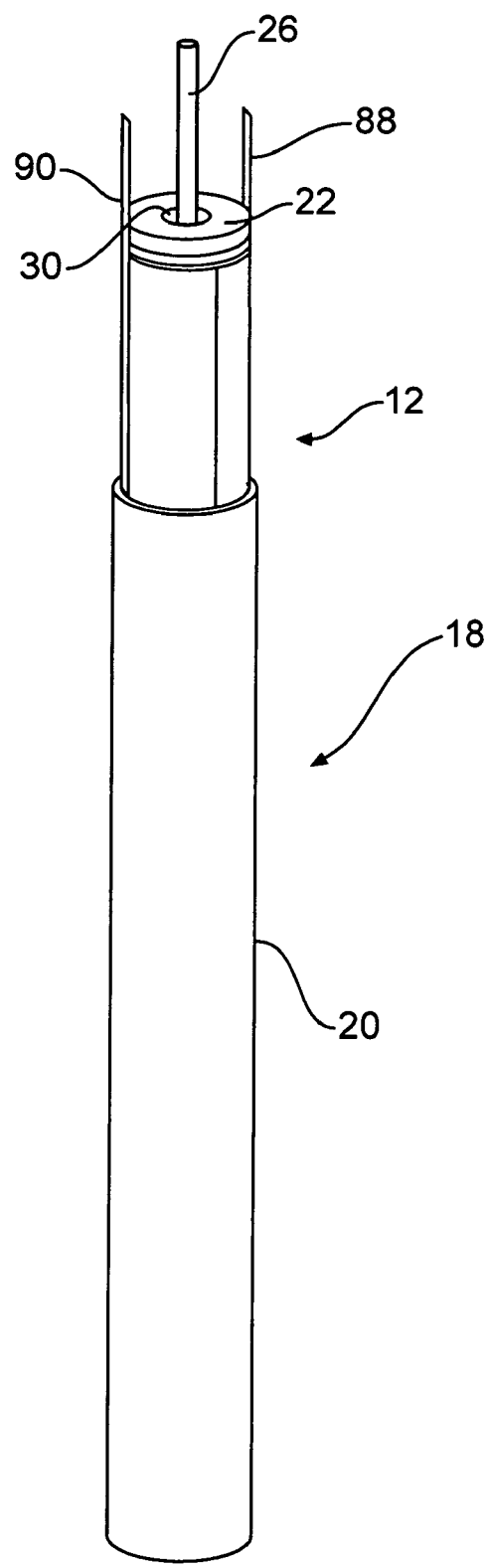
FIG. 11 is an isometric view showing the electrode assembly 12 being housed inside a casing 18.

FIG. 6 shows the anode electrode 16 comprising an anode current collector 82 having an anode active material 84 such as an alkali metal, preferably lithium, contacted to both of the major sides except at a left, distal end 82A of the current collector. There, anode active material only contacts one major side of the current collector 82 for a distance equal to the length of the outer wrap of the final jellyroll assembly 12 (FIG. 10). The reason for this will be explained in detail hereinafter.

The anode current collector 82 is preferably of nickel, copper or stainless steel and is shown having a grid pattern of open perforations surrounded by a peripheral edge 86 devoid of perforations. Alternatively, the anode current collector may be completely solid. A pair of spaced apart leads 88 and 90, preferably integral with the current collector extends from the edge. Lead 88 extends from the peripheral edge at the junction of its upper and left sides while lead 90 extends from the upper side spaced inwardly from the left side. As will be explained in detail hereinafter, the spacing between the leads 88, 90 are to provide them on opposite sides of the jellyroll electrode assembly 12 when it is housed inside the casing 18. While two leads are shown, there may be more or less anode leads depending on the current requirements of the cell.

As shown in FIG. 7, the anode 16 is fitted into the upper two-ply separator pocket 66A overlaying the lower separator pocket 66B enveloping the cathode 14. The right edge 92 of the anode 16 (FIG. 6) is now adjacent to the couple 44 and the vertical heat-seal 80 securing the separator pockets 66a and 66B to each other. The leads 88, 90 reside outside the separator seal with the right lead 90 abutting the lower sealed edge 76.

Figure 9:
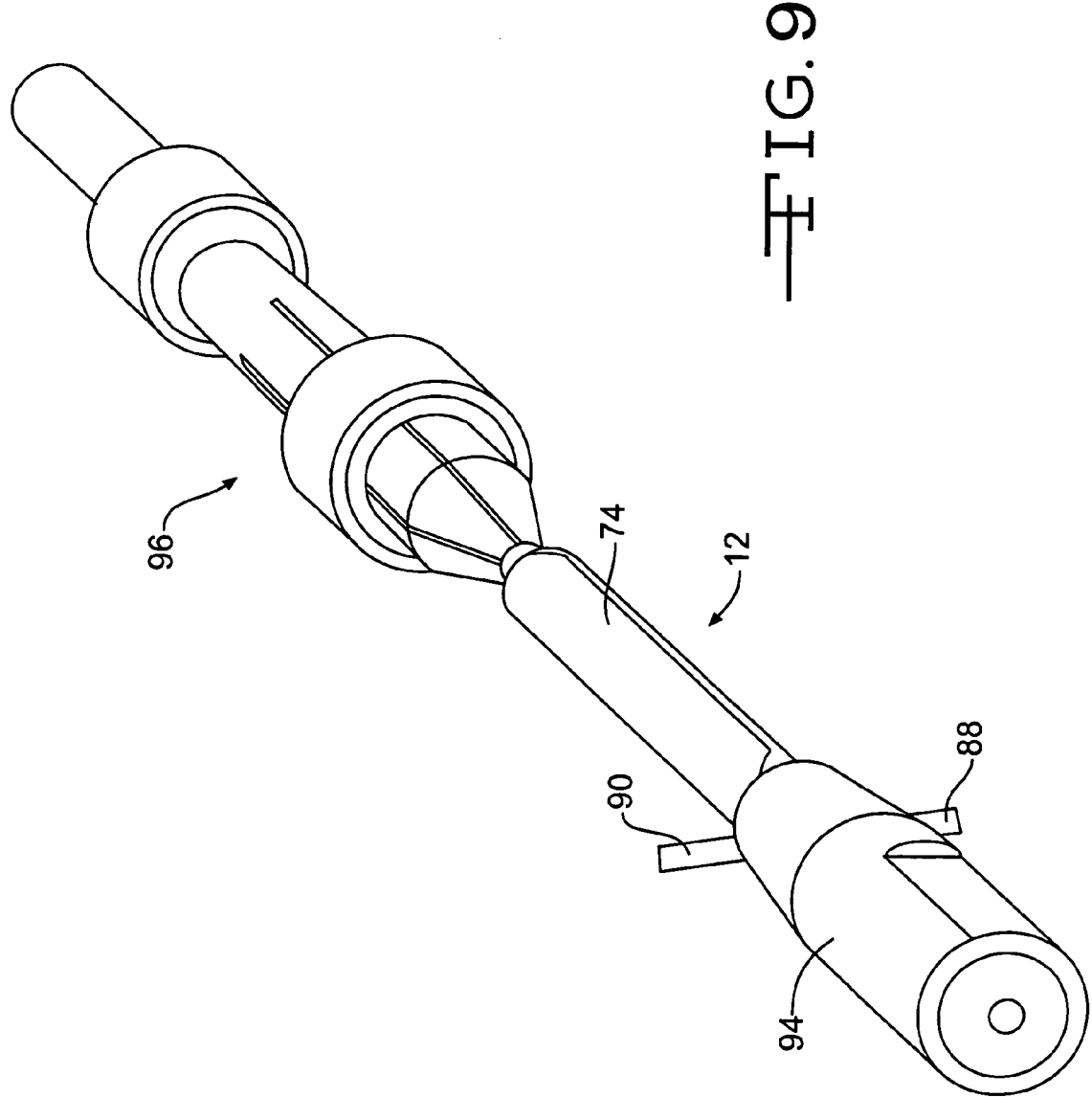
FIG. 9 is an isometric view showing the cathode and anode of FIG. 8 after being wound into the jellyroll electrode assembly 12.

The jellyroll electrode assembly is formed by attaching a guide 94 to the terminal pin 26 and upper lid 28 of the header assembly 22 and a collet 96 to the distal end 44A of the couple 44. A rotating force is applied to the collet 96 to rotate the header assembly 22 including the supported terminal pin 26/couple 44 approximately 1½ turns to begin wrapping the cathode current collector 42 around the couple 44. In this method of winding, the couple 44 acts as the mandrel. The inner end of the anode 16 is spaced from the couple 44 so that it is about 540° offset from the inner end of the cathode current collector 42 welded to the couple. This winding continues until the anode 16 overlaying the cathode 14 is provided in the jellyroll electrode assembly 12 (FIGS. 9 and 10). In the electrode assembly, the anode active material 84 contacted to both major sides of the anode current collector 82 always "faces" the cathode active material 54. However, the distal end 82A of the anode current collector 82 having the anode active material 84 on only the inner side thereof extends beyond the right edge 60 of the cathode electrode 14 to provide a complete outer wrap around the electrode assembly 12 beginning at the point labeled 98 in FIG. 10 and extending to the end of the anode 16. This is substantially the outer circumference of the electrode assembly. There is no need for the anode current collector 82 to have anode active material 84 on its outer side in the outer wrap because there is no cathode active material facing that side of the anode current collector.

The jellyroll electrode assembly 12 is then fitted into the cylindrical tube 20 of the casing 18 with the distal end 82A of the anode current collector 82 provided with anode active material 84 on only the inner side thereof being immediately adjacent to the tube 20 sidewall. The header assembly 22 comprising the lid 28 snuggly fits into the upper open end of the tube 20 with the diametrically opposed anode leads 88 and 90 extending from the tube 20. The leads are trimmed flush to the top of the upper lid. The lid 28 is then hermetically sealed to the tube 20 such as by laser welding. The leads 88, 90 captured between the lid 28 and tube 22 electrically connect the anode 16 to the casing 18 serving as the negative cell terminal. The terminal pin 26 contacting the cathode 16 by the intermediate couple 44 and insulated from the lid 28 and casing 18 by the sealing glass 30 serves as the cathode terminal. For a more detailed description of a cell having an electrode lead captured between a lid and casing, reference is made to U.S. Pat. No. 6,586,134 to Skoumpris. This patent is assigned to the assignee of the present invention and incorporated herein by reference.

Figure 12:
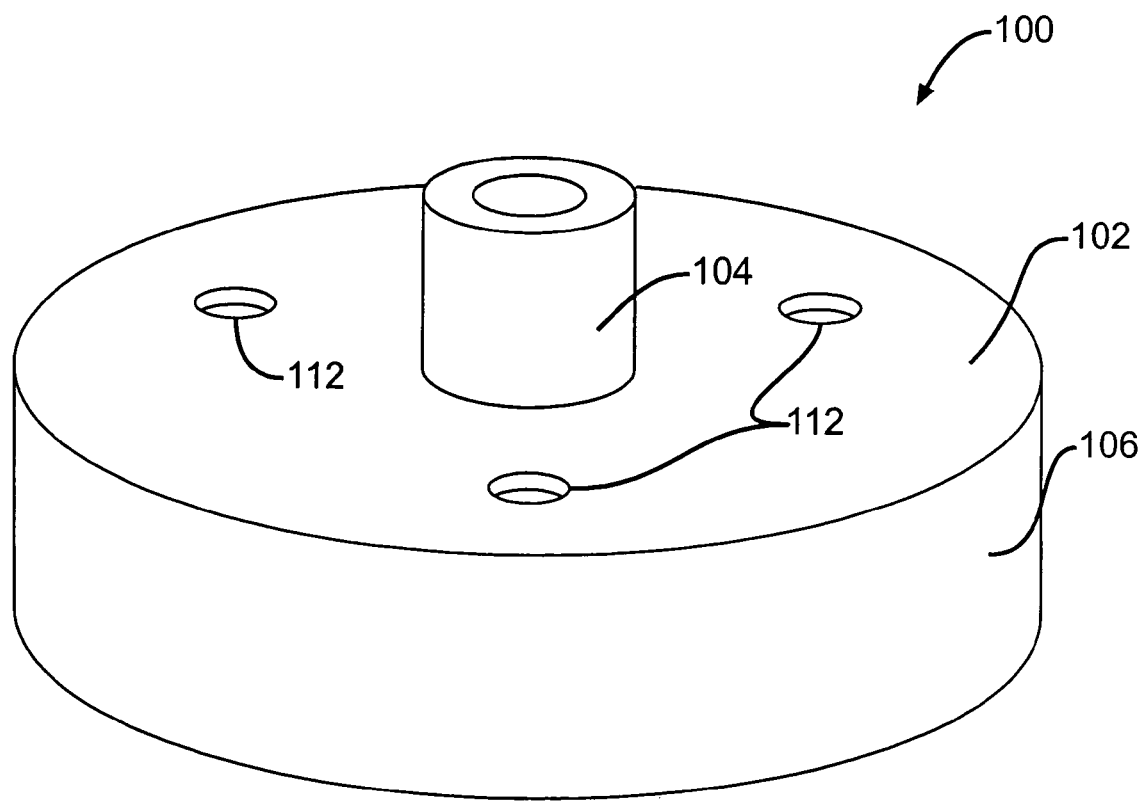
FIG. 12 is an isometric view of a lower insulator 100 insulating the lower portion of the pin and the bottom of the electrode assembly 12 centered in the casing 18 from the lower lid and casing sidewalls.
Figure 13:
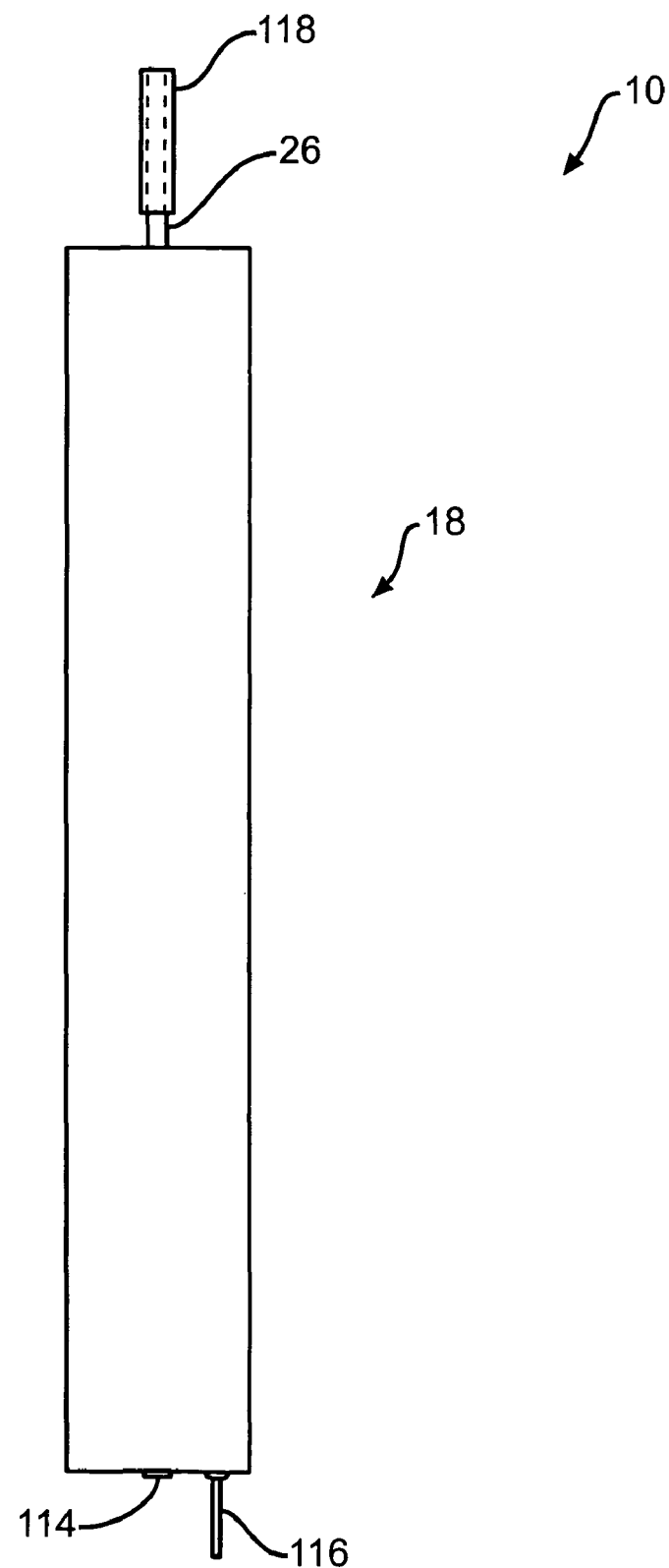
FIG. 13 is a side elevational view of the completed electrochemical cell 10.

As shown in FIGS. 1 and 12, the lower end of the electrode assembly 12 is provided with a lower insulator 100. The lower insulator 100 is a unitary member of a polymeric material and comprises a disc 102 supporting an upper centrally located sleeve 104 and a depending annular rim 106. Together, the disc 102 and annular rim 106 provide the shape of an inverted cup. The lower insulator 100 is fitted onto the distal end 44A of the terminal couple 44 to electrically separate the pin and the lower portion of the electrode assembly from the bottom of the lower lid and the casing sidewalls.

Prior to activating the electrode assembly, the circular shaped lower lid 24, which is of the same material as the casing tube 20, is received in the lower end of the tube 20 in a tight fitting relationship and secured therein by a weld 108 (FIG. 1). A central opening 110 in the lower lid 24 provides for filling an electrolyte (not shown) into the casing 18 for activating the cell 10. Three openings 112 in the disc 102 help the electrolyte flow through the lower insulator 100 to wet the electrode assembly 12. A fill plug 114 is then fitted into the central opening 110 in the closure plate 24 and sealed therein such as by laser welding to hermetically seal the cell.

Figure 14:
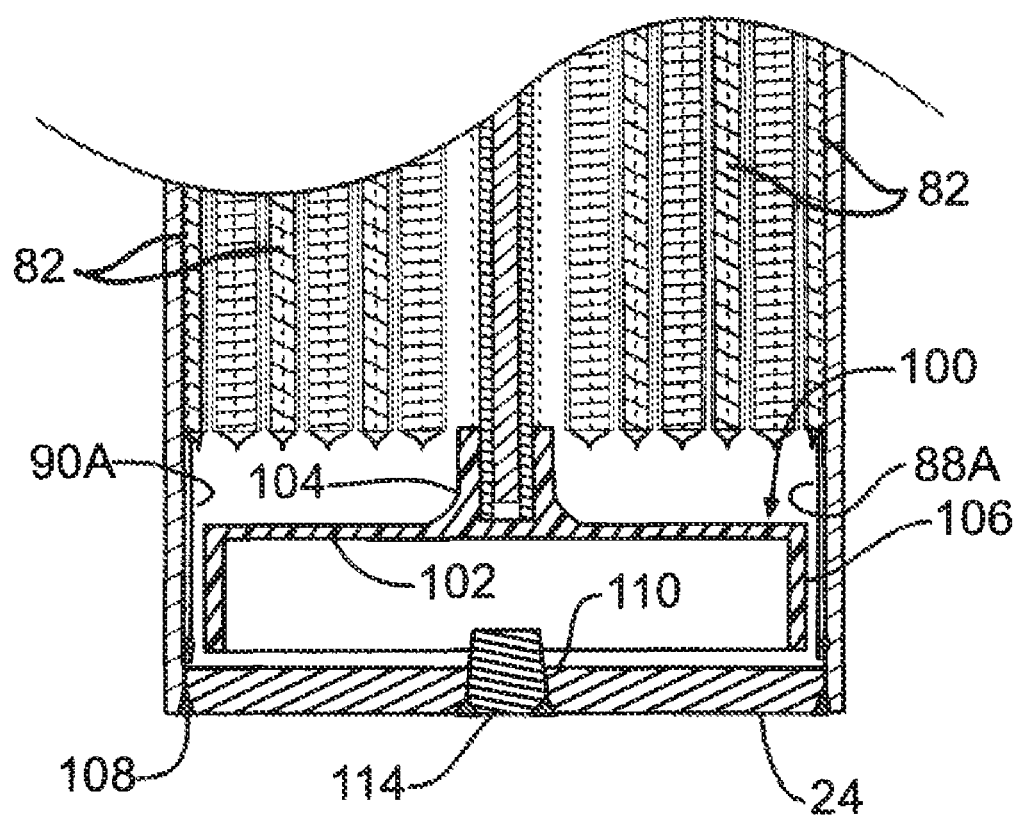
FIG. 14 is a partial cross-sectional view of an alternate embodiment of the cell with the anode leads 88A and 90A captured hermetically sealed between the lower lid 24 and the casing tube 20.

FIG. 14 shows an alternated embodiment of the cell with the anode leads 88A and 90A captured between and hermetically sealed to the lower lid 24 and the tube 22. In that case, the anode electrode 16 is fitted into the upper two-ply separator pocket 66A (FIG. 7) with the anode edge 92 adjacent to the couple 44 and vertical heat-seal 80, but with the leads 88A and 90A abutting the separator sealed edge 78 instead of sealed edge 76. In this embodiment, sealed edge 78 extends to the flap 74 while sealed edge 78 ends a distance spaced there from. Also, in FIG. 9, the leads 88A and 90A are adjacent to the collet 96, rather than the guide 94. In all other respects, the electrode assembly is formed as described with respect to FIGS. 1 to 13.

The cell is completed by securing a negative polarity connection pin 116 to the lower lid 24 in electrical continuity with the casing tube 20 and upper lid 22 between which the anode current collector leads 88, 90 are captured. A sleeve 118 is fitted onto the positive terminal pin 26 to help in making electrical connection there.

By way of example, in an illustrative primary cell, the anode is of an alkali metal, preferably lithium, contacted to a nickel, copper or stainless steel current collector. The active material of the cathode body is a silver vanadium oxide cathode material as described in U.S. Pat. Nos. 4,310,609 and 4,391,729 or copper silver vanadium oxide as described in U.S. Pat. Nos. 5,472,810 and 5,516,340, all assigned to the assignee of the present invention, the disclosures of which are hereby incorporated by reference. Other suitable cathode materials include copper vanadium oxide, manganese dioxide, titanium disulfide, copper oxide, copper sulfide, iron sulfide, and iron disulfide. Carbon, fluorinated carbon and lithium cobalt oxide are also useful cathode active materials.

Illustrative separator 66 materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The activating electrolyte can be a 1.0 M to 1.4 M solution of $LiAsF_6$ or $LiPF_6$ in a 50:50 mixture of, by volume, 1,2-dimethoxyethene and propylene carbonate.

This electrochemical system is of a primary cell type. However, those skilled in the art will readily recognize that the cell of the present invention can be readily adapted to both primary electrochemical systems of either a solid cathode or liquid cathode type, or a secondary cell such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, "hairy carbon" etc.), which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCO_{0.92}Sn_{0.08}O_2$ and $LiCo_{1-x}Ni_xO_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

Thus, various embodiments of electrochemical cells are described having at least one electrode provided with a current collector partially devoid of active material. This uncovered current collector portion is secured to a terminal pin or a terminal pin couple such as by welding. The current collector is preferably of a perforated structure with the separator for the electrode being secured to itself through the perforations. This helps maintain the separator and enveloped electrode in proper alignment with the terminal pin during the winding process. Securing the electrode separator to itself through the perforated current collector also helps maintain alignment of the other, counter electrode. During the winding process the second electrode is captured between the adjacent wraps of the properly aligned first electrode, and this tends to maintain alignment of both electrodes.

It is appreciated that various modifications to the inventive concepts described herein may be apparent to those of ordinary skill in the art without departing from the scope of the present invention as defined by the appended claims.

What is claimed is:

1. An electrochemical cell, which comprises:
   a) a first electrode comprising a first active material contacted to a first current collector, wherein an uncovered portion of the first current collector is left un-contacted by the first active material and at least a minor portion of the uncovered first current collector portion is provided with a plurality of perforations;
   b) a terminal pin electrically connected to the first current collector at the uncovered portion;
   c) a second, counter electrode comprising a second active material contacted to a second current collector;
   d) a separator segregating the first electrode from direct contact with the second electrode and comprising a continuous sheet folded back upon itself along a crease to provide the separator having an upper separator portion overlaying a lower separator portion, the upper and lower separator portions having a length extending from the crease to an opposite end, wherein the first electrode is disposed between the upper separator portion at least partially secured to the lower separator portion along at least a portion of an aligned peripheral edge of the upper and lower separator portions and through the plurality of perforations of the first current collector at an intermediate location along the folded separator length between and parallel to the crease and the opposite end thereof, thereby forming a first envelope portion housing the first electrode including the terminal pin and a second envelope portion housing the second electrode, the second envelope portion extending from where the upper and lower separator portions contact each other through the plurality of perforations to the opposite end of the folded separator, and wherein an extending portion of the terminal pin extends out beyond the separator to interrupt the peripheral edge thereof;
   e) a casing housing the first and second electrodes in an aligned and overlaying relationship, wherein the terminal pin is electrically insulated from the casing connected to the second electrode as its terminal; and
   f) an electrolyte activating the first and second electrodes housed in the casing.

2. The electrochemical cell of claim 1 wherein the first envelope portion is secured to the aligned and overlaying second envelope portion through the plurality of perforations of the first current collector.

3. The electrochemical cell of claim 1 wherein the terminal pin is supported in a lid by an insulating glass and wherein the lid is fitted to the casing housing the first and second electrodes.

4. The electrochemical cell of claim 1 wherein the terminal pin is received in a couple directly connected to the uncovered portion of the first current collector.

5. The electrochemical cell of claim 1 wherein the first and second electrodes are provided in a jellyroll electrode assembly with the second current collector having at least two extending leads captured between a lid and a cylindrical tube comprising the casing.

6. The electrochemical cell of claim 1 wherein the upper separator portion is secured to the lower separator portion through the perforated portion of the uncovered portion of the first current collector at an intermediate location between where the terminal pin is electrically connected to the first current collector at the uncovered portion of the first current collector and the crease.

7. The electrochemical cell of claim 1 wherein the uncovered portion of the first current collector is spaced from the crease.

8. An electrochemical cell, which comprises:
   a) a cathode comprising a cathode active material contacted to a cathode current collector having an uncovered portion left un-covered by the cathode active material and at least a minor portion of the uncovered cathode current collector portion is provided with a plurality of perforations;

b) a terminal pin electrically connected to the first current collector at the uncovered portion;
c) an anode comprising an anode active material contacted to an anode current collector;
d) a separator segregating the cathode from direct contact with the anode and comprising a continuous sheet folded back upon itself along a crease to provide the separator having an upper separator portion overlaying a lower separator portion, the upper and lower separator portions having a length extending from the crease to an opposite end, wherein the cathode is disposed between the upper separator portion at least partially secured to the lower separator portion along at least a portion of an aligned peripheral edge of the upper and lower separator portions and through the plurality of perforations of the cathode current collector at an intermediate location along the folded separator length between and parallel to the crease and the opposite end thereof, thereby forming a first envelope portion housing the cathode including the terminal pin and a second envelope portion housing the anode, the second envelope portion extending from where the upper and lower separator portions contact each other through the plurality of perforations to the opposite end of the folded separator, and wherein an extending portion of the terminal pin extends out beyond the separator to interrupt the peripheral edge thereof;
e) a casing housing the anode and cathode in an aligned and overlaying relationship, wherein the terminal pin is electrically insulated from the casing connected to the anode as its terminal; and
f) an electrolyte activating the anode and cathode housed in the casing.

9. The electrochemical cell of claim 8 wherein the terminal pin is supported in a lid by an insulating glass and wherein the lid is fitted to a cylindrical casing housing the anode and cathode.

10. The electrochemical cell of claim 8 wherein the terminal pin is of molybdenum and is received in a couple secured to the uncovered portion of the cathode current collector.

11. The electrochemical cell of claim 8 wherein the anode and cathode are provided in a jellyroll electrode assembly with the anode current collector having at least two extending leads captured between a lid and a cylindrical tube comprising the casing.

12. The electrochemical cell of claim 8 wherein the anode and cathode are provided as a jellyroll wound electrode assembly with an outer wrap of the anode having the anode active material on only an inner side of the anode current collector.

13. The electrochemical cell of claim 8 wherein the upper separator portion is secured to the lower separator portion through the perforated portion of the uncovered portion of the cathode current collector at an intermediate location between where the terminal pin is electrically connected to the cathode current collector at the uncovered portion of the cathode current collector and the crease.

14. An electrochemical cell, which comprises:
a) a first electrode comprising a first active material contacted to a first current collector, wherein an uncovered portion of the first current collector is left un-contacted by the first active material and at least a minor portion of the uncovered first current collector portion is provided with a plurality of perforations;
b) a second, counter electrode comprising a second active material contacted to a second current collector;
c) a separator segregating the first electrode from direct contact with the second electrode and comprising a continuous sheet folded back upon itself along a crease to provide the separator having an upper separator portion overlaying a lower separator portion, the upper and lower separator portions having a length extending from the crease to an opposite end, wherein the first electrode is disposed between the upper separator portion at least partially secured to the lower separator portion through the plurality of perforations of the first current collector at an intermediate location along the folded separator length between and parallel to the crease and the opposite end thereof, thereby forming a first envelope portion housing the first electrode;
d) a casing housing the first and second electrodes; and
e) an electrolyte activating the first and second electrodes housed in the casing.

15. The electrochemical cell of claim 14 wherein the folded separator forms a second envelope portion housing the second electrode in an aligned overlaying relationship with the first electrode.

16. The electrochemical cell of claim 15 wherein the first envelope portion is secured to the aligned and overlaying second envelope portion through the uncovered perforations, of the first current collector.

17. The electrochemical cell of claim 14 wherein a terminal pin is electrically connected to the first current collector at the uncovered portion and an extending portion of the terminal pin extends out beyond the separator to interrupt the peripheral edge of the upper and lower separator portions secured to each other.

18. The electrochemical cell of claim 17 wherein the terminal pin is supported in a lid by an insulating glass and wherein the lid is fitted to the casing housing the first and second electrodes.

19. The electrochemical cell of claim 17 wherein the terminal pin is received in a couple directly connected to the uncovered portion of the first current collector.

20. The electrochemical cell of claim 14 wherein the first and second electrodes are provided in a jellyroll electrode assembly with the second current collector having at least two extending leads captured between a lid and a cylindrical tube comprising the casing.

21. The electrochemical cell of claim 14 wherein the terminal pin is electrically insulated from the casing connected to the second electrode as its terminal.

22. An electrochemical cell, which comprises:
a) a cathode comprising a cathode active material contacted to a cathode current collector having an uncovered portion left un-covered by the cathode active material and at least a minor portion of the uncovered cathode current collector portion is provided with a plurality of perforations;
b) an anode comprising an anode active material contacted to an anode current collector;
c) a separator segregating the cathode from direct contact with the anode and comprising a continuous sheet folded back upon itself along a crease to provide the separator having an upper separator portion overlaying a lower separator portion, the upper and lower separator portions having a length extending from the crease to an opposite end, wherein the first electrode is disposed between the upper separator portion at least partially secured to the lower separator portion through the plurality of perforations of the cathode current collector at an intermediate location along the separator length between and parallel to the crease and the opposite end thereof and along at least a portion of an aligned peripheral edge, thereby forming a first envelope portion housing the cathode including the terminal pin connected to the uncovered cathode current collector portion;
d) a casing housing the aligned anode and cathode; and
e) an electrolyte activating the anode and cathode housed in the casing.

23. The electrochemical cell of claim 22 wherein the folded separator forms a second envelope portion housing the anode in an aligned overlaying relationship with the cathode.

* * * * *